(12) United States Patent
Dodor et al.

(10) Patent No.: US 11,347,872 B2
(45) Date of Patent: *May 31, 2022

(54) DYNAMIC CYBERSECURITY PROTECTION MECHANISM FOR DATA STORAGE DEVICES

(71) Applicant: International Business Machines Corporation, Armonk, NY (US)

(72) Inventors: Dmitri Dodor, Pepperell, MA (US); Leonid Rodniansky, Allston, MA (US)

(73) Assignee: International Business Machines Corporation, Armonk, NY (US)

( * ) Notice: Subject to any disclaimer, the term of this patent is extended or adjusted under 35 U.S.C. 154(b) by 497 days.

This patent is subject to a terminal disclaimer.

(21) Appl. No.: 16/457,937

(22) Filed: Jun. 29, 2019

(65) Prior Publication Data
US 2019/0325150 A1    Oct. 24, 2019

Related U.S. Application Data

(63) Continuation of application No. 15/872,116, filed on Jan. 16, 2018.

(51) Int. Cl.
*G06F 21/60* (2013.01)
*G06F 21/62* (2013.01)
*G06F 16/27* (2019.01)

(52) U.S. Cl.
CPC ............ *G06F 21/604* (2013.01); *G06F 16/27* (2019.01); *G06F 21/6218* (2013.01)

(58) Field of Classification Search
CPC ...... G06F 21/604; G06F 16/122; G06F 16/27; G06F 16/2358; G06F 21/6218
See application file for complete search history.

(56) References Cited

U.S. PATENT DOCUMENTS

| | | | | |
|---|---|---|---|---|
| 6,279,113 | B1 * | 8/2001 | Vaidya | H04L 63/1416 709/229 |
| 6,804,780 | B1 * | 10/2004 | Touboul | G06F 21/51 713/181 |
| 7,281,270 | B2 * | 10/2007 | Piesco | G06F 21/552 726/22 |
| 7,454,792 | B2 * | 11/2008 | Cantrell | H04L 43/00 709/224 |

(Continued)

*Primary Examiner* — Tongoc Tran
(74) *Attorney, Agent, or Firm* — Jeffrey S. LaBaw; David H. Judson (57) ABSTRACT

A mechanism that dynamically creates a new access policy for a set of database servers when a policy violation has been identified in a database access response issued by any database in the set. The new access policy is then propagated in real-time and instantiated across the set of database servers so as to inoculate the other database servers and pre-empt any new compromise of information based on the intruder's actions that were found to have produced the policy violation in the first instance. Thus, the approach uses a response policy violation at one database server of a set to trigger generation of a new request access policy that is then instantiated across one or more other database servers. This response policy violation-to-request access policy instantiation occurs in substantially real-time so that the intruder cannot use a prior successful access request to obtain information from other databases using a similar strategy.

7 Claims, 5 Drawing Sheets

(56) References Cited

U.S. PATENT DOCUMENTS

| | | | |
|---|---|---|---|
| 7,814,075 B2* | 10/2010 | Sack | G06F 21/6227 |
| | | | 707/694 |
| 8,141,154 B2* | 3/2012 | Gruzman | G06F 21/562 |
| | | | 713/188 |
| 8,397,282 B2* | 3/2013 | Turley | H04L 63/0263 |
| | | | 726/11 |
| 8,799,225 B2* | 8/2014 | Vaitzblit | G06F 21/6227 |
| | | | 707/648 |
| 9,258,329 B2* | 2/2016 | Narayanaswamy | |
| | | | H04L 63/0245 |
| 9,398,043 B1* | 7/2016 | Yang | H04L 63/1441 |
| 10,319,230 B2* | 6/2019 | Abraham | G08G 1/096716 |
| 10,387,617 B2* | 8/2019 | Bagwell | G16H 70/40 |
| 2003/0115484 A1* | 6/2003 | Moriconi | G02B 6/132 |
| | | | 726/1 |
| 2005/0203921 A1* | 9/2005 | Newman | G06F 21/55 |
| 2007/0162749 A1* | 7/2007 | Lim | G06F 21/6227 |
| | | | 713/167 |
| 2007/0226695 A1* | 9/2007 | Krishnaprasad | G06Q 10/06 |
| | | | 717/126 |
| 2008/0046964 A1* | 2/2008 | Muralidharan | G06F 21/6227 |
| | | | 726/1 |
| 2011/0125894 A1* | 5/2011 | Anderson | H04L 9/3213 |
| | | | 709/224 |
| 2014/0165133 A1* | 6/2014 | Foley | H04L 43/08 |
| | | | 726/1 |
| 2017/0024408 A1* | 1/2017 | Foley | H04L 63/1408 |

* cited by examiner

DYNAMIC CYBERSECURITY PROTECTION MECHANISM FOR DATA STORAGE DEVICES

BACKGROUND OF THE INVENTION

Technical Field

This disclosure relates generally to securing resources in a distributed computing environment and, in particular, to the protection and auditing of file systems.

Background of the Related Art

Existing information security solutions often leave databases vulnerable to advanced hacking techniques and insider attacks. Indeed, databases have been and continue to be a primary target for external hackers and insider attacks. This is because databases contain an organization's most valuable information, including customer records, payment card data, and financial results. Statistics show that hackers are skilled at using techniques, such as cross-site scripting, to penetrate perimeter defenses and reach the database. Existing security solutions, such as intrusion detection systems, lack the knowledge of database protocols and structures required to detect inappropriate activities. Other solutions that rely on native DBMS logs, such as security information and event management (SIEM) systems, do not operate in real-time, can be evaded by users with elevated privileges (which hackers often acquire), and may introduce problematic overhead. To address these issues, it is known to provide systems to automatically monitor database transactions, and to respond in real-time to access policy violations. One such system is IBM® InfoSphere™ Guardium®, a unified, cross-platform solution that both protects databases in real-time and automates compliance auditing processes.

While systems of this type provide significant advantages, a malicious client can still seek to obtain information illegitimately by taking advantage of the fact that a database server may respond to an access request (by providing all or some of the requested data in a response) while follow-on policy checking takes place with respect to that access request. While in this usual circumstance the system can then issue an appropriate alert and terminate the session to that database server when a policy violation is determined to exist, the malicious client is able to obtain at least some data; it may then repeat this access process with other database servers to attempt to obtain further response(s). The problem is exacerbated because many enterprises often run a large number of database servers concurrently. By moving from one database server to another (and making different request(s) at each of them), a malicious intruder can obtain legitimate database responses from individual database servers and then aggregate or combine those responses, thereby potentially compromising information security.

BRIEF SUMMARY

A database access control system is augmented to include a protection mechanism that dynamically instantiates an access restriction policy (or updates an existing such policy) for each of a set of database servers and their associated storage devices in a cyber ecosystem (e.g., a particular protection domain) upon receipt of an indication of an access violation at any one of the database servers (or those data storage devices). In this manner, the protection mechanism in effect proactively inoculates the other data storage devices (those not subject to the original attack) going forward.

According to this approach, the mechanism dynamically creates a new (or modified, or updated) access policy for a set of database servers when a policy violation has been identified in a database access response issued by any database in the set. The policy violation typically is identified by applying an existing database table extrusion rule to the database access response. The new access policy is then propagated in real-time and instantiated across the set of database servers so as to inoculate the other database servers and pre-empt any new compromise of information based on the intruder's actions that were found to have triggered the extrusion rule and produced the policy violation in the first instance. Thus, the approach uses a response policy violation at one database server of a set to trigger generation of a new request access policy that is then instantiated across one or more other database servers. This response policy violation-to-request access policy instantiation occurs in substantially real-time so that the intruder cannot use a prior successful access request to obtain information from other databases using a similar strategy.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
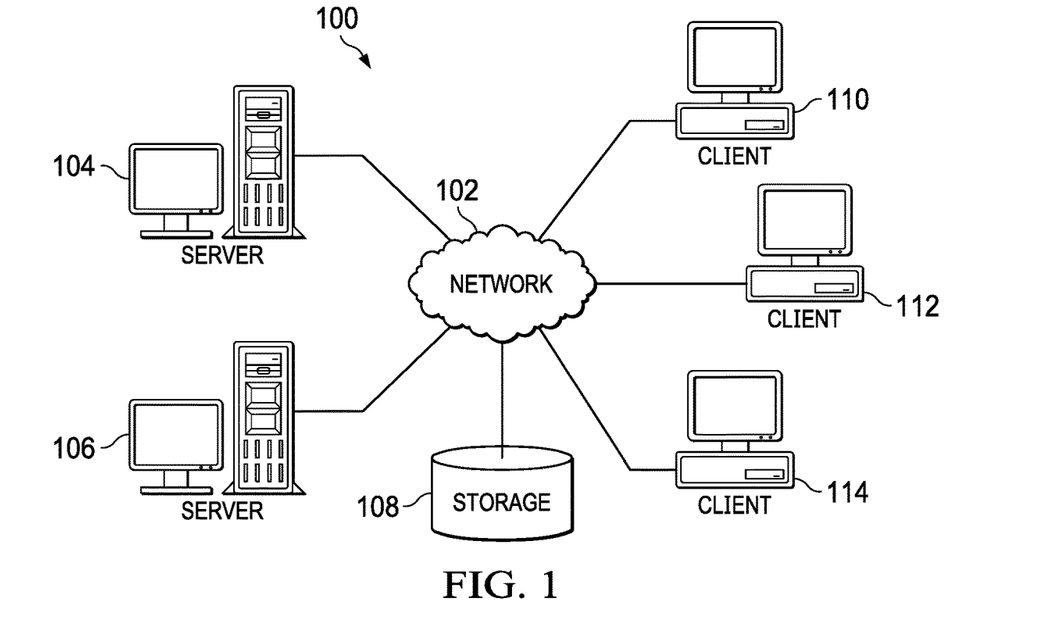
FIG. 1 depicts an exemplary block diagram of a distributed data processing environment in which exemplary aspects of the illustrative embodiments may be implemented.
Figure 2:
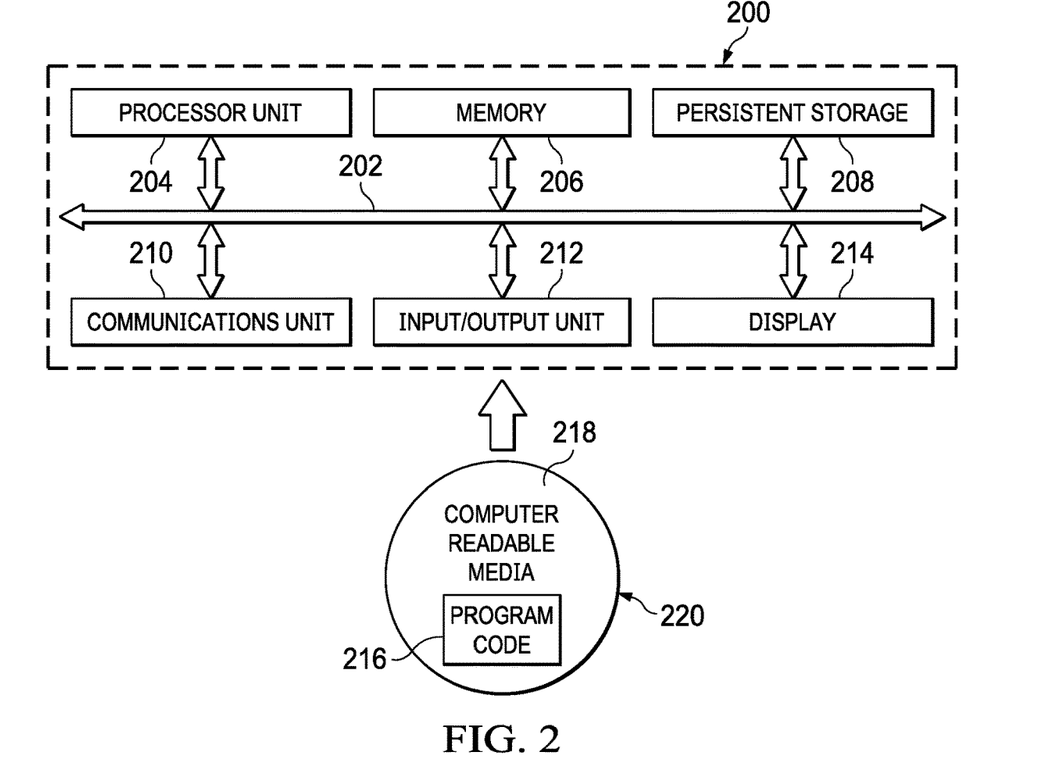
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212.

The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a representative but non-limiting implementation, the techniques herein are described in the context of a transaction-processing system or environment that comprises distributed and mainframe components, working cooperatively to respond to HTTP and Web Service client end-user service or transaction requests. Such a system or environment typically comprises multiple components, configured in a distributed manner. A distributed component of a larger multi-component transaction-processing environment typically comprises at least a computer, operating system platform, applications, networking and an associated security engine that provides distributed transaction processing functions, such as networking interactions with the client end-user, and identification and authentication functions in HTTP and Web Services scenarios. The transaction-processing system or environment of this type typically also includes a mainframe component that includes at least a computer, operating system platform, applications, networking and associated security engine that provides high performance back-end transaction processing and large database functionality.

Database Access Protection and Auditing

As described above, it is known to provide systems that protect databases in real-time, and that automate compliance auditing processes. One such commercial system is IBM® InfoSphere™ Guardium. The solution supports all major database platforms, enterprise applications, and operating systems (UNIX, Linux, Windows, and z/OS), and it has been extended to distributed systems like Hadoop and supported in the cloud.

Figure 3:
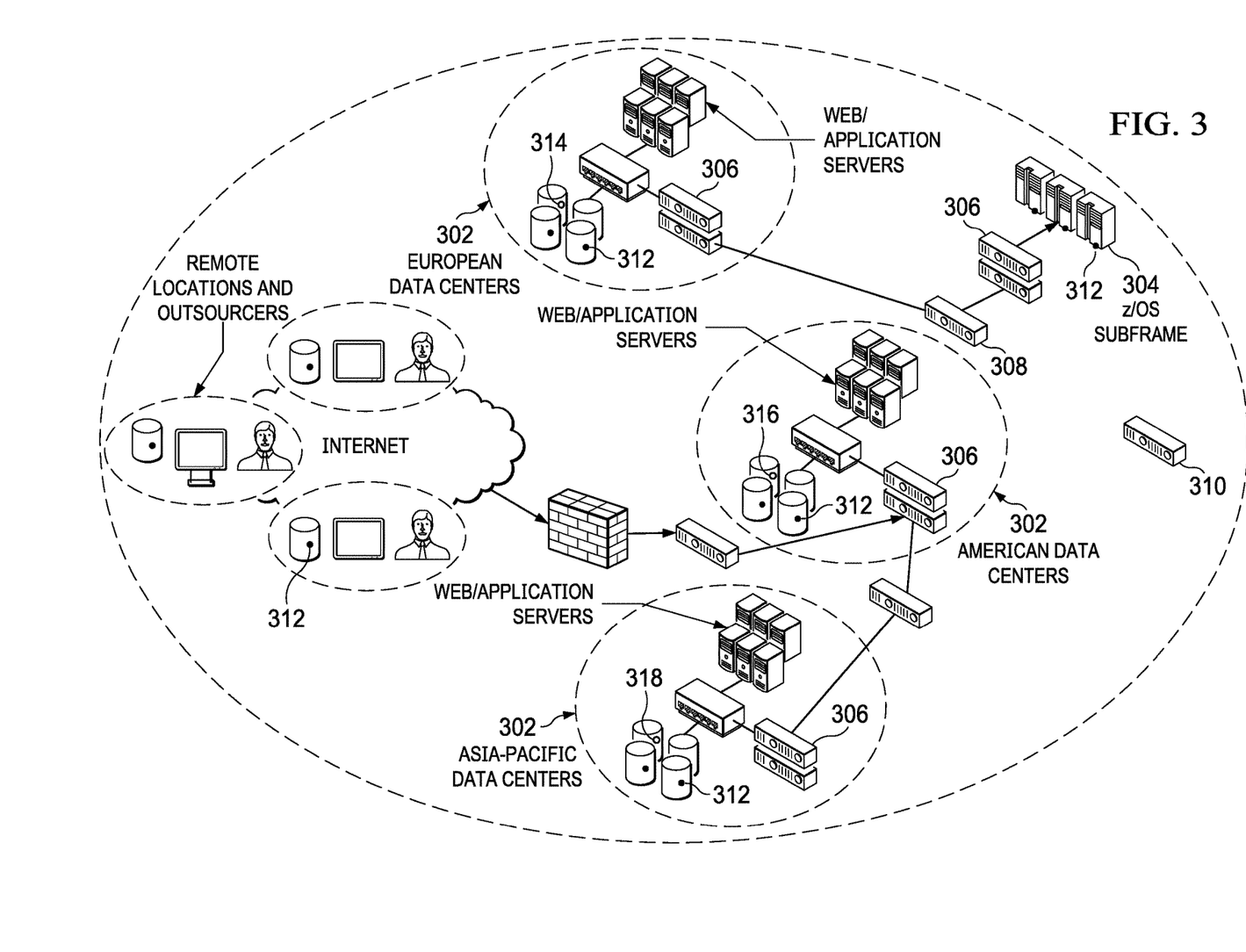
FIG. 3 depicts a known database access monitoring and auditing system.

FIG. 3 depicts a representative implementation of this known system (or "platform") for monitoring several databases across data centers in an enterprise 300. In this embodiment, the enterprise has several data centers 302, as well as internal financial systems 304 that are to be monitored. This architecture typically comprises a set of appliances (hardware and software) and agents (typically software) that can be configured to perform various functions. Appliances typically include the following subcategories: collectors 306, aggregators 308, and a central manager 310. A collector 306 is an appliance that is used for real-time capture and analysis of the database activity. An aggregator 308 is an appliance that is used to reporting activity from the collectors and to provide consolidated reporting from multiple collectors. A central manager (CM) 310 is a specialized functionality that preferably is enabled on an aggregator appliance. The CM function is used to manage and control multiple appliances in the database monitoring system. Agents typically include the following subcategories: a software TAP agent (S-TAP®) 312, which is installed on the database server and is used to monitor and relay the observed activity to the Guardium collector appliance. An installation manager agent (GIM) 314, which is installed on the database server and is used to facilitate agent installation and the updating and configuration modification of agents. A change audit system (CAS) agent 316, which is installed on the database server and is used to capture change audit information of configuration files and more on the database server. An instance discovery agent 318, which is installed on the database server and is used to obtain database, listener, and port information.

As shown in FIG. 3, the software TAP agents 312 may also reside in remote locations, e.g., in trusted partner installations, within the cloud, or the like. Although FIG. 3 illustrates an enterprise with a scalable multi-tier architecture comprising multiple data centers (located across multiple continents), this is not a limitation. The system components may be implemented within a single data center, across multiple data centers that are within the same geographic region, and the like.

A system of this type typically can be deployed in a variety of operational modes. Thus, for example, in a database activity monitoring mode (or in a vulnerability assessment monitoring mode), the collectors 306 monitor and analyze database activity to provide continuous fine-grained auditing and reporting, real-time policy-based alerting and database access controls. Typically, the central manager 310 acts as a single point of management for the entire deployment. With the central manager, system administrators (or other permitted individuals) can define enterprise-wide policies, alerts, queries and reports, install patches, push configuration, and perform a variety of other administrative tasks from a single console. In addition, data from multiple collectors can be aggregated to the aggregation server (the aggregator 308) to provide holistic views and generate enterprise-level reports. In addition, the system enables the software TAP agent to be configured in various ways that can affect the overall architecture of the solution. Thus, for example, the software TAP agent 312 can be configured to relay the captured information to one collector, to two or more collectors, to load balance the captured data between multiple collectors, or the like. In one basic software TAP configuration option, the software TAP agent is configured to send traffic to one collector only. Traffic includes all of the relevant activity (access and results) that the agent observes between the client (application, user, and so on) and the database. In an alternative configuration, the software TAP agent is configured to register with multiple collectors but sends traffic only to one collector at a time. In this configuration the agent sends all of its traffic to one collector, unless it encounters connectivity issues to that collector that triggers a failover to a secondary collector as configured.

Figure 4:
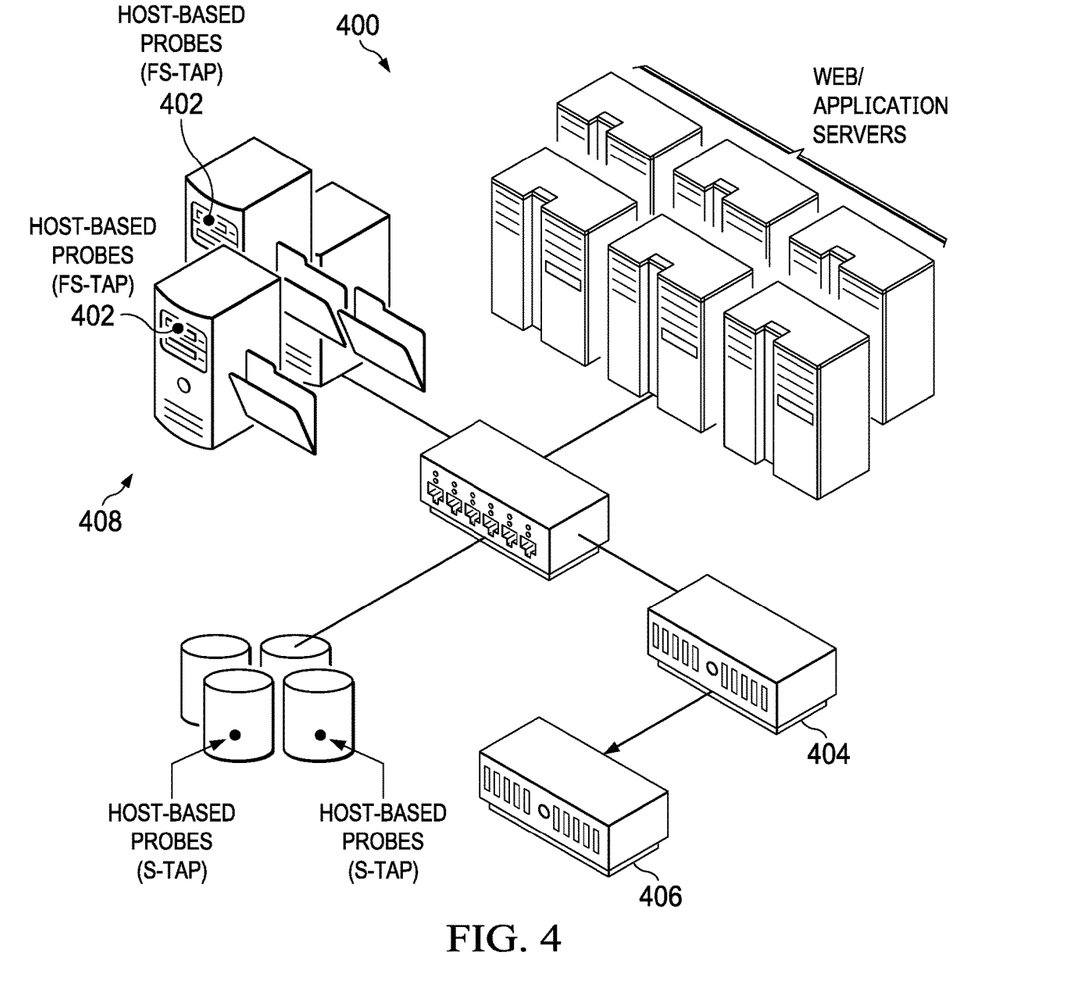
FIG. 4 depicts an enterprise-wide embodiment of a continuous, policy-based, real-time database system and file system activity monitor platform in which the techniques of this disclosure may be implemented.

The above-described monitoring and auditing platform can also be extended to file systems to provide enterprise-scale monitoring and auditing of both database system and file system access. FIG. 4 depicts one such monitoring system or platform 400 that comprises agents 402, collectors 404, and at least one central manager 406. This drawing depicts the database systems and the TAP agents as previously described. In this embodiment, file systems 408 across an enterprise (and potentially external thereto) also are monitored to collect and store file access data. To this end, the machines that mount the file systems themselves utilize software file system (FS)-TAP agents 402 for this purpose. Whether hosted on a database system or file system, the agents collect the access data for auditing purposes. That data is audited by the agent according to a security policy, and the resulting audited data is sent (by the agent) to a collector 404. Collectors provide the audited data to the central manager appliance 406. The central manager 404 stores the data, enables the data to be searched, is enabled for generating reports on the data, and aggregates the data for permanent or semi-permanent storage.

Typically, the central manager includes a data store and a policy manager. The policy manager may execute on a collector appliance, and it enables policy-based filtering based on one or more security policies stored in the data store. In particular, database access policies dictate what database(s), tables, objects, etc. are monitored by the system. A policy that is defined on the central manager application and pushed down to the monitored database server defines the database access activity that is to be monitored. The data collected by the monitored database server is returned to the central manager, where it is analyzed for policy compliance. A monitored database server may have a particular policy that differs from another monitored database server, although typically the database servers share many of the policies. By managing these operations centrally, the system enables continuous, policy-based, real-time monitoring of all database access activities, including actions by privileged users. The approach also enables the enterprise to discover and classify all data being accessed, including sensitive data. The central manager-based approach facilitates data protection compliance automation on an enterprise basis. The system may also include an administrator console that includes a graphical user interface (GUI) for initiating searches against the collected data, for displaying reports, and so forth. Typically, all communications among the components occur over secure connections and/or transport protocols.

The central manager preferably stores the configuration (the policies that are being implemented), as well as the collected database access data (sometimes referred to as the "audited" data). Typically, a policy (or "security policy") has one or more rules that allow administrators (or "users") to filter for specific operations, for specific objects, events, actions, or the like. Preferably, the audited data includes information about the users performing a particular database access operation, the machine wherein the database system or server resides, the particular database changes, other database constructs, and so forth. In one particular embodiment, the database access data that is collected includes one or more of the following: object name, object size, data created, owner, read user, write user, user privileges and rights, permissions, changes or other modifications to the data or to file system metadata, timestamps, and the like. Preferably, the database access data also includes one or more actions associated with the operation, such as: read, write, execute, create, rename, delete, change owner, permissions, properties, and the like.

The policy manager is operative to apply a particular security policy to the audit trail data that is collected and received at the central manager. As noted above, the nature and type of the policy may vary.

An agent executing in a local database system typically includes an inspection engine component that runs the security policy provided by the policy manager. The inspection engine component runs the security policy as it collects and analyzes the database access activity and traffic in real-time.

For completeness, the following are definitions for terms and phrases described above:

An "aggregation server" is an appliance to collect and merge information from multiple collection servers to a single Aggregation server. A list of reports is generated.

An "administration console" is graphical interface that guides the user through systems administration tasks such as deployment, configuration, monitoring, starting and stopping applications, services, and resources.

The term "aggregator" refers to the process of collecting and merging information from multiple sources so that a complete enterprise view of information may be reported.

An "alert" is a message indicating that an exception or policy rule violation was detected.

An "audit log" is a chronological record of system activities. These logs typically provide a record sufficient to permit reconstruction, review, and examination of sequence of environments and activities surrounding or leading to operation, procedure, or event in a transaction from inception to results.

An "audit policy" is an ordered set of rules to be applied to the observed traffic between file system clients and servers.

An "audit trail" is a chronological record of events.

The notion of "central management" as used herein typically refers to using at least one central manager component that is used to monitor and control other units, which are referred to as managed units.

The term "classification" typically refers to discovering and classifying sensitive data so that the system can make and enforce effective access policy decisions.

A "classifier" is a job, consisting of a classification policy and one or more defined data sources, used for discovering and classifying sensitive data. A "data classifier" is a script, pattern, or group that defines the data to be processed by an action.

A "collector" is a set of programs, repository, and hardware that inspects the data stream, stores information, and enables the auditing, monitoring, reporting, and alerting of database system access activities.

An "event" is a notable occurrence at a particular point in time.

An "exception" is a condition or event that has been triggered based on thresholds, values, or policies. An "exception rule" (policy rule) evaluates real-time exceptions returned by the server.

A "policy" is a set of rules and actions that are required to be performed when certain events or status conditions occur in an environment. A policy typically represents a set of organizational rules and the logic that the database activity monitoring system uses to manage and that are applied to a specific managed resource as a service-specific policy. A security policy may be specified in a machine-readable policy specification language, such as XACML. In a database system, a security policy typically has associated therewith a set of one or more "extrusion" rules, wherein an extrusion rule typically is established for a particular table in a database that is protected by the security policy. An extrusion rule evaluates data returned by the server (i.e., after a database access request has occurred at the server), wherein that data typically is referred to as a result set. Thus, for example, assume that the database access query sent by the client and is processed by access rule (e.g., "select name, SSN from cust_info") returns the following result set: "John," "000-00-0000" and "Jane," "111-11-1111," a permitted user can create an extrusion rule that processes the result set, e.g., to mask the returned data. An extrusion rule causes the access control system to look for a pattern in the result set (in this example to mask). This mechanism can be refined by specifying an access rule for particular database objects or procedures.

A "real-time alert" is an alert triggered by a security policy rule.

A "software TAP" is a lightweight software agent installed on a database system server or system. It monitors database system access activity and forwards information about that traffic to a system appliance, which can be deployed anywhere on the network. A particular software TAP agent is installed on or in association with a particular database system server so it can monitor database system-related traffic that is local to that database system. In addition to monitoring local connections, S-TAP can be used to monitor any network traffic that is visible from the database system server on which it is installed. Thus, in an alternative embodiment, a given software agent also can act as a collector on remote network segments, where it is not practical to install a collector appliance.

A "security policy" is a set of rules that regulate how an organization manages, protects, and distributes sensitive information.

Figure 5:
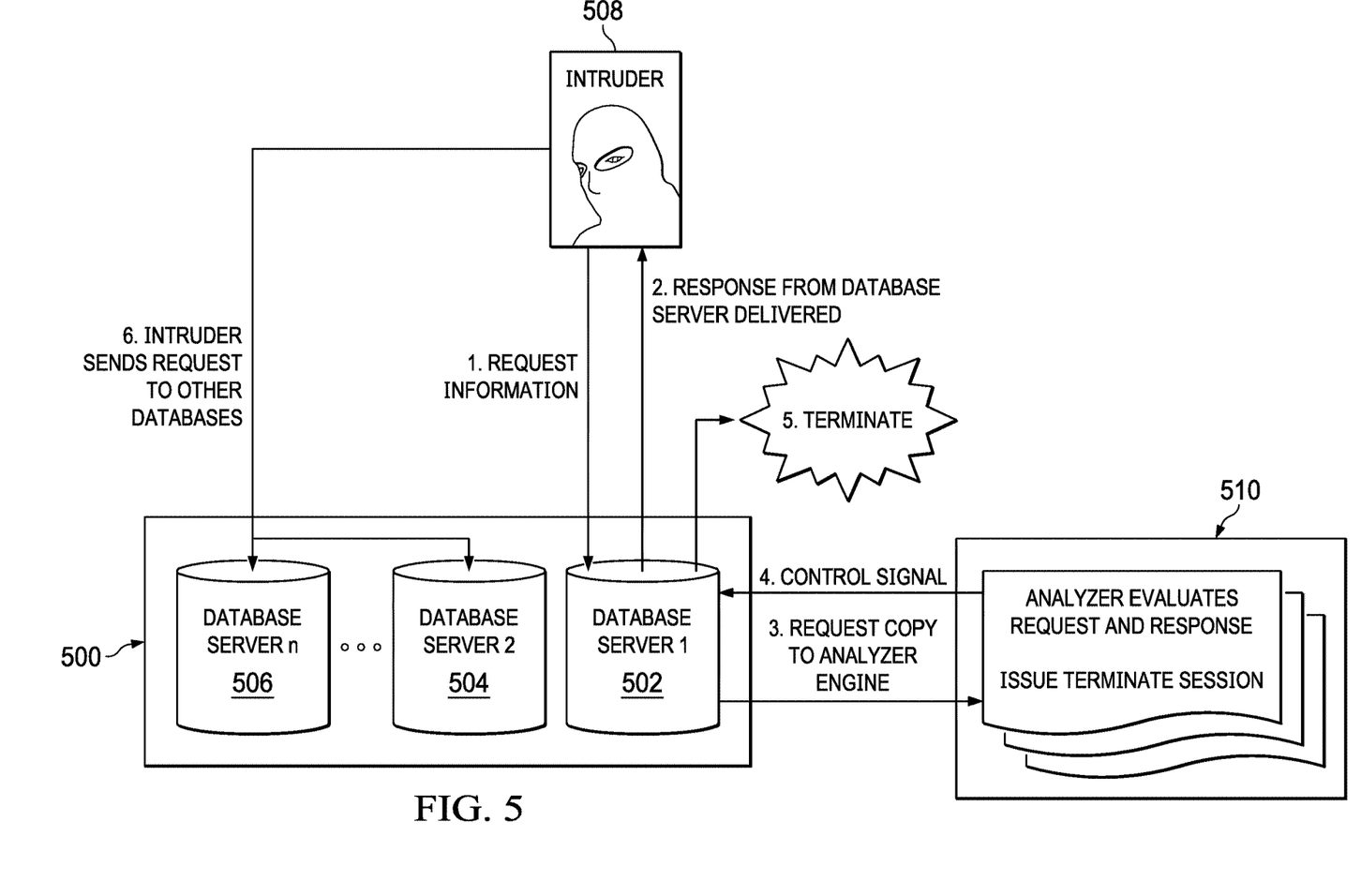
FIG. 5 depicts an attack scenario in a known database server farm environment.

With the above as background, FIG. 5 represents a known use case that is addressed by the protection mechanism of this disclosure. Thus, and as depicted in FIG. 5, a database server farm is shown that comprises a set of data storage devices 500, namely a first database server 502, a second database server 504, and an $n^{th}$ database server 506. For convenience, the data storage devices being managed by the database servers are omitted. Database servers 502, 504 and 506 share a common database access policy that has been configured in a known manner and instantiated with respect to these data storage devices. A client 508, which in this example scenario may be either a legitimate database client application (as described above) or instead a malicious intruder, makes database requests to the one or more of the database servers. In this example, the database client access request is initiated to the first database server 502 and originates from a malicious source instead of a legitimate client.

In this example, and after the client has passed an authentication (in some manner), at step (1) the client/intruder 508 sends a database access request to the first database server 502. At step (2), the database server 502 returns to the requesting client a database response that typically includes the data initially requested by the client (or at least some of it). Typically, the client would then be expected to make additional database access requests within the database access session that is now on-going. At step (3), the database access request and the response to that request (having been intercepted by the TAP agent running locally) are copied to an analyzing engine that executes in a database server monitor 510. In a typical embodiment, the analyzing engine executes in a collector. At step (4), the analyzer engine evaluates the request and its associated response, typically by applying one or more extrusion rule(s) that have been pre-configured as a policy. In a known manner, the analyzer may then determine that a database access violation has occurred, in which case the collector then issues to the database server TAP agent a control signal that instructs the database server to terminate the on-going session with the client 508. At step (5), the database server terminates the on-going session.

While the above-described technique provides some data protection, the intruder in this example does succeed in obtaining at least some response information before the session is terminated. As such, the intruder may then be able to re-start the session anew, this time again issuing another request (e.g. a next access request) to another one of the database server(s) in the data server farm. This request may leverage the information already obtained in the first pass. This is step (6). Even though the follow-on response may later be evaluated to be suspect (and the follow-on session terminated as well), in this manner the malicious intruder is able to obtain valid response(s) to its database access requests.

To address this situation, this disclosure augments the analyzer in a manner that is now described.

Dynamic Cyber Protection for a Set of Database Servers

Figure 6:
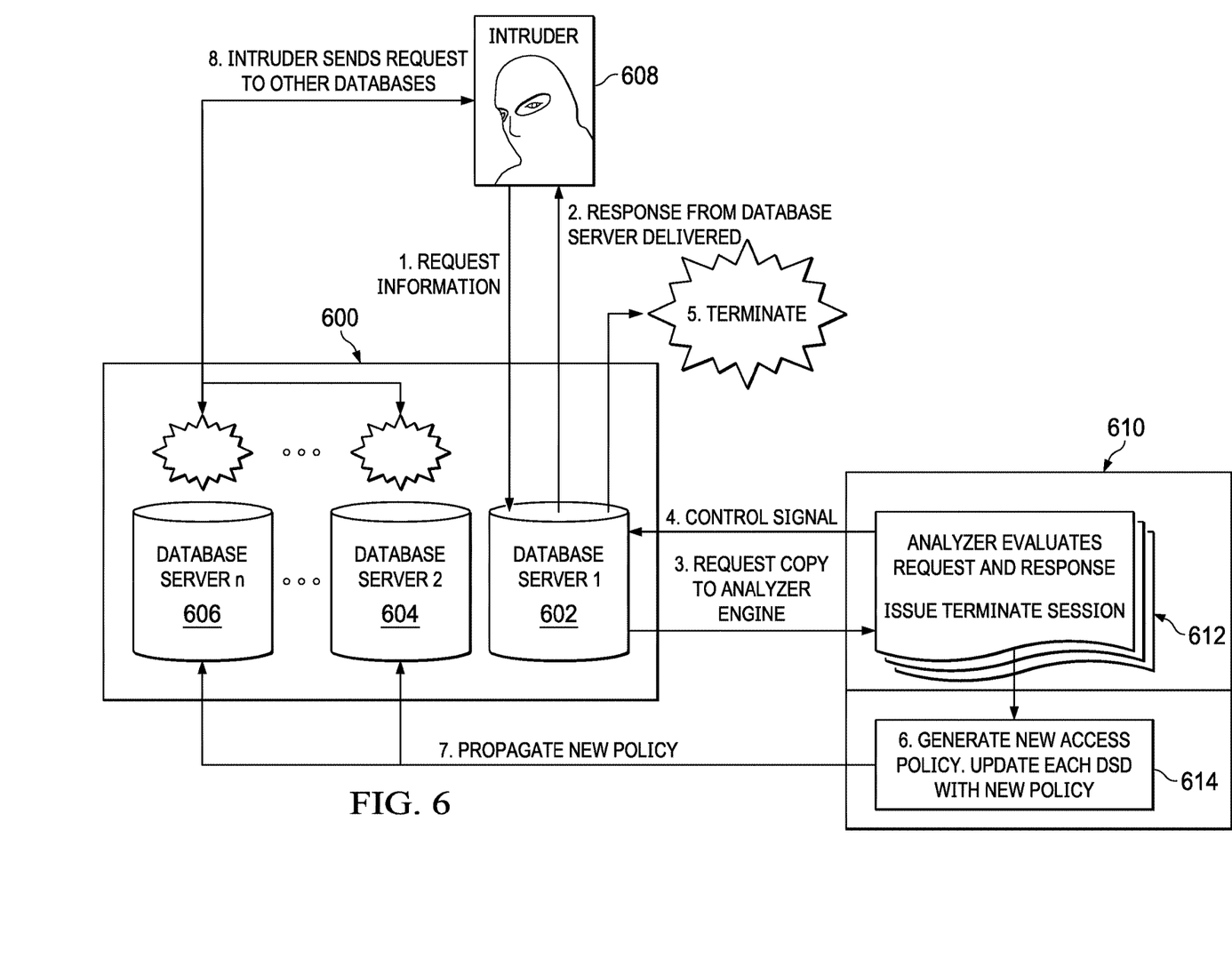
FIG. 6 depicts how the technique of this disclosure mitigates the attack scenario.

Thus, and as depicted in FIG. 6, a database server farm is shown that comprises a set of data storage devices 600, namely a first database server 602, a second database server 604, and an $n^{th}$ database server 606. For convenience, the data storage devices being managed by the database servers again are omitted. Database servers 602, 604 and 606 share at least one common database access policy that has been configured in a known manner and instantiated with respect to these data storage devices. A client 608, which once again may be either a legitimate database client application or instead a malicious intruder, makes database requests to the one or more of the database servers. In this example, the database client access request is initiated to the first database server 602 and originates from a malicious source instead of a legitimate client. Although not depicted, the system also implements the database server intercepting agent (the TAP agent) that intercepts the database access request(s) and forwards them (and their associated responses) to the database access monitor component 610. The database access monitor component comprises an analyzer 612, which typically runs in the collector, as well as a policy generator module 614, which typically runs in the central manager. The policy generator module 614 is not present in the FIG. 5 embodiment.

In this example, and once again after the client has passed an authentication (in some manner), at step (1) the client/intruder 608 sends a database access request to the first database server 602. At step (2), the database server 602 returns to the requesting client a data response that typically includes the data initially requested by the client (or at least some of it). As noted above, the client would then be expected to make additional database access requests within the database access session that is now on-going. At step (3), the database access request and the response to that request (having been intercepted by the TAP agent) are once again copied to the analyzing engine 612 that executes in a database server monitor 610. The analyzing engine has the capability of examining the payload of the database response against one or more extrusion rule(s) that comprise a policy. The analyzer engine evaluates the request and its associated response that were delivered by the TAP agent against an extrusion rule. In this example scenario, and by evaluating the response payload against the extrusion rule, the analyzer determines that a database access violation has occurred. Thus, at step (4), the collector once again then issues to the database server a control signal that instructs the database server to terminate the on-going session with the client 608. At step (5), the database server again terminates the on-going session to restrict the client from a further database access, at least with respect to the session that had been established.

Unlike the access request and response flow shown in FIG. 5, however, this is not the end of the process. Rather, and as depicted in FIG. 6, the output of the analyzer 612 is also supplied to the policy generator 614, which as noted above typically executes in the central manager. At step (6), and according to this disclosure, the policy generator is then operative to generate a new access policy based on the particular response violation that has just been determined by the analyzer to have occurred. As used herein, generating a "new" access policy may include one or more of: generation of an entirely new policy, modification or augmentation of an existing policy, updating of an existing policy, enhancement of an existing policy, or otherwise.

According to this approach, the mechanism dynamically creates the new access policy for a set of database servers (in this example, servers 604 and 606) when a policy violation has been identified in a database access response issued by any database in the set (in this example, server 602). As noted, typically the policy violation is identified by applying an existing database table extrusion rule to the database access response. At step (7), the new access policy is then propagated and instantiated across the set of database servers that shared the access policy at issue so as to inoculate the other database servers and pre-empt any new compromise of information based on the intruder's actions that were found to have triggered the extrusion rule and produced the policy violation in the first instance. Thus, the approach uses a response policy violation at one database server of a set to trigger generation of a new request access policy that is then instantiated across one or more other database servers. This response policy violation-to-request access policy instantiation occurs in substantially real-time so that the intruder cannot use a prior successful access request to obtain information from other databases using a similar strategy.

The new access policy typically differs from the original access policy (the one that has been determined to be violated) in one or more appropriate respect(s) to identify the client (e.g., by credential, IP address, MAC address, etc.), the client access activity (e.g., SSN request, etc.), access type, activity type or characteristic, or some other property, attribute or characteristic, etc. so that subsequent access attempts by the client can be handled (e.g., blocked, quarantined, alerted, etc.) as per the requirements that are now specified by the new access policy. The particular syntax and format of the new access policy will depend on the implementation and the desired access restriction to be imposed. Thus, in some circumstances the new access policy will simply block all future access attempts that are associated with the user credential in question. In other circumstances the new access policy may enable the client to perform a subsequent access but only if one or more conditions set forth in the new access policy are met with respect to the then-current database access request. The new access policy may place new restrictions (e.g., source IP address, destination IP address, time-of-day, or other conditions) on subsequent access requests that must be met before the subsequent access is permitted. In this manner, fine-grained control over these subsequent access requests (by the client) are then enforced proactively instead of the system having to only learn of the violation(s) after-the-fact.

While the preferred approach herein generates the new access policy upon a determination that an extrusion rule of a policy has been violated (by a prior response), the system may require that multiple such rules (or given extrusion rules of an extrusion rule set) of the original access policy be violated before taking this action. This variant reduces the potential for false positives.

The approach herein does place a requirement that even legitimate clients carefully compose their database access requests, as violation (or contravention) of an extrusion rule has the effect of instantiating a new access policy that can inhibit even legitimate access. As a variant, the system also may provide a notification or other alerting (to other systems) that the new access policy has been triggered by database access activity that (although triggering a violation) does appear to have taken place on behalf of a legitimate user.

The response policy violation-to-request access policy generation as described herein typically is carried out with respect to just the access policy in question, e.g., as reflected in the extrusion rule that has been triggered. In some cases, it may be desirable to respond to the database access violation by updating not only the database access policy that has been found to be violated, but also one or more policies that may relate to (or otherwise depend on) the violated policy.

The subject matter herein provides numerous advantages. The system learns from a violation and acts immediately to generate and propagate the new access policy designed to address the violation. This "once-violated, block" strategy provides significant advantage, especially as the number of the database servers in the system being monitored increases. The approach addresses the time delay(s) that are otherwise inherent in current approaches wherein the time necessary to hold a response, analyze it (through the extrusion rules) and then return a control command to terminate the session), can enable the intruder to move compromise other machines in the enterprise. The response policy violation-to-access policy rewrite function provides significant benefits because it inoculates the other database servers promptly and efficiently, with low processing and communication overhead. In particular, it enables immunization of all data storage devices within a particular cyber ecosystem based on a response (that triggers the extrusion rule in the policy) to just a single one of those devices. As a consequence, an intruder to the system ends up making the system less accessible, in a manner analogous to how a small dose of a virus triggers an immune system to develop resistance to a known virus type. Stated another way, the approach herein in effect provides instant hardening of all data storage devices in the system based on a single violation at any one of the devices. The approach thus provides simultaneous protection of all servers based on an identified attack from just a single data response.

Generalizing, the functionality described above (in whole or in part) may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment. The security server itself (or functions thereof, such as the monitor process) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the central manager or agent functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the TAP and central manager components are implemented in a computer (which may be a special purpose computer), preferably in software executed by one or more processors. The software is maintained in one or more data stores or memories associated with the one or more processors, and the software may be implemented as one or more computer programs. Collectively, this hardware and software comprises the file system monitoring system described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

There may be multiple collectors and more than one central manager. A particular central manager typically has one or more components that may be co-located or in part distributed from one another.

The analyzer and access policy generation functions described may be combined and executed in other machines than as described herein.

The database access system software TAP technique described herein is not limited for use with any particular database system access protocol, and it may be applied in other database system access schemes generally.

While software-based taps are preferred, the database system agent may in the alternative be implemented using a hardware-based network tap, or span port, to duplicate the database system access activity.

The techniques herein may also be used for file system monitoring and access control.

The techniques herein provide for improvements to another technology or technical field, namely, database systems, as well as improvements to the functioning of distributed systems used to manage and control such database systems.

Having described our invention, what we claim is as follow:

The invention claimed is:

1. A method operative in a database access control system, the database access control system being associated with a set of database servers that share an access policy, comprising:
   receiving from a given one of the database servers a copy of a database access request issued by a client, together with a response to that database access request that was served to the client by the given one of the database servers;
   analyzing the response against the access policy;
   upon determining that the response includes a violation of the access policy, automatically generating a new access policy; and
   real-time propagating the new access policy to one or more other database servers in the set for instantiation on the one or more other database servers.

2. The method as described in claim 1 wherein analyzing the response against the access policy executes an extrusion rule.

3. The method as described in claim 2 wherein execution of the extrusion rule compares a payload in the response to a value in the extrusion rule to determine whether the violation of the access policy has occurred.

4. The method as described in claim 1 further including issuing a command to terminate a session initiated by the client to the given one of the database servers and during which the response was generated.

5. The method as described in claim 1 wherein the new access policy includes information that identifies the client to the one or more other database servers.

6. The method as described in claim 1 wherein the copy of the database access requests and the response are received from a tap executing at the given one of the database servers, the analyzing occurs at a collector, and the generating and propagating occurs at a central manager.

7. The method as described in claim 1 wherein the new access policy immunizes the one or more other database servers in the set against one or more additional database access requests originated by the client.

\* \* \* \* \*